United States Patent [19]
Heft

[11] 3,859,659
[45] Jan. 7, 1975

[54] CLUTTER SUPPRESSION CIRCUIT
[75] Inventor: Eugene J. Heft, Lexington, Mass.
[73] Assignee: Sanders Associates, Inc., Nashua, N.H.
[22] Filed: Nov. 19, 1970
[21] Appl. No.: 90,927

[52] U.S. Cl. .............................................. 343/7.7
[51] Int. Cl. ............................................. G01s 9/42
[58] Field of Search ................................. 343/7.7, 8

[56] References Cited
UNITED STATES PATENTS
3,707,718   12/1972   Ames .................................. 343/7.7

Primary Examiner—T. H. Tubbesing
Attorney, Agent, or Firm—Louis Etlinger; Richard I. Seligman

[57] ABSTRACT

In a Moving Target Indicator (MTI) radar system, false alarms caused by large clutter signals are eliminated by using a limiter in Doppler bandwith to limit the maximum power at the input to predetection filters and, thus, the maximum signal levels at the threshold circuits.

7 Claims, 2 Drawing Figures

INVENTOR
EUGENE J. HEFT
By Richard L. Seligman
ATTORNEY

CLUTTER SUPPRESSION CIRCUIT

The invention herein described was made in the course of or under a contract or subcontract thereunder with the Department of the Army.

BACKGROUND OF THE INVENTION

In conventional MTI radars, strong clutter returns are displayed along with normal target returns thereby making difficult the desired recognition of echo signals from targets. In such a radar threshold circuits are employed; however, these circuits can threshold on clutter thereby giving false information regarding targets.

SUMMARY OF THE INVENTION

Accordingly, it is an object of this invention to provide an improved MTI radar.

It is another object of the invention to provide a clutter suppression circuit.

Briefly, clutter suppression is achieved by providing a hard limiter in the Doppler amplifying circuit to limit the maximum power available at the input to the predetection filter bank whereby the limited power out of the limiter from wide bandwidth clutter will be divided and applied to all the filters of the predetection filter bank while the limited power from a true target signal having a narrow bandwidth will appear mainly at a single filter of the predetection filter bank. Threshold circuits are adjusted to correspond to the desired limit level, and thereby not threshold on divided clutter signal.

BRIEF DESCRIPTION OF THE DRAWINGS

The above-mentioned and other features and objects of this invention will become more apparent by reference to the following description taken in conjunction with the accompanying drawings, in which.

DESCRIPTION OF A PREFERRED EMBODIMENT

Figure 1:
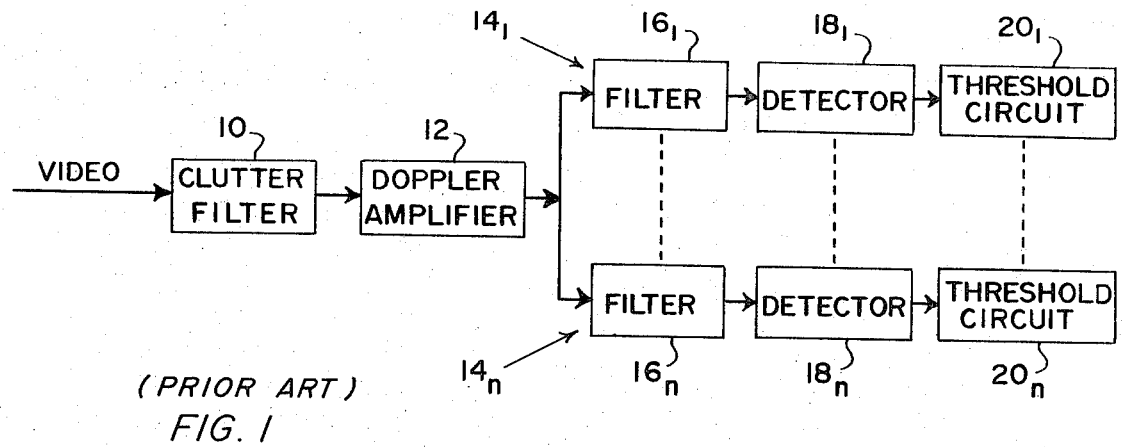
FIG. 1 is a block diagram of a portion of a conventional MTI filter bank radar.

Referring now to FIG. 1, there is illustrated thereby a portion of a conventional MTI filter bank radar receiver whereby the video signal of the receiver, which contains large returns from fixed clutter, random amplitude modulation on such large returns due to noise in the transmitter, and amplitude modulation due to moving targets, is applied to a clutter filter 10. Clutter filter 10 removes the large DC level due to fixed clutter and low frequency components of the order of less than 100 Hz. The output from clutter filter 10 is amplified by a Doppler amplifier 12 and applied to a number of detection channels $14_1$ through $14_n$. Each of the detection channels 14 is made up of a filter 16, a detector 18, and a threshold circuit 20. The filters 16 are narrow band filters, each encompassing a small number of the Doppler frequencies in the bandwidth to be covered.

The principal problem with this arrangement is that the devices 20 can cause thresholding on a clutter signal thereby causing false target information to be displayed. This can occur anywhere throughout the Doppler spectrum since residual clutter generally has a frequency ranging over the entire Doppler band. For example, clutter will be relatively constant over a Doppler band of 100 Hz to 3 KHz.

Figure 2:
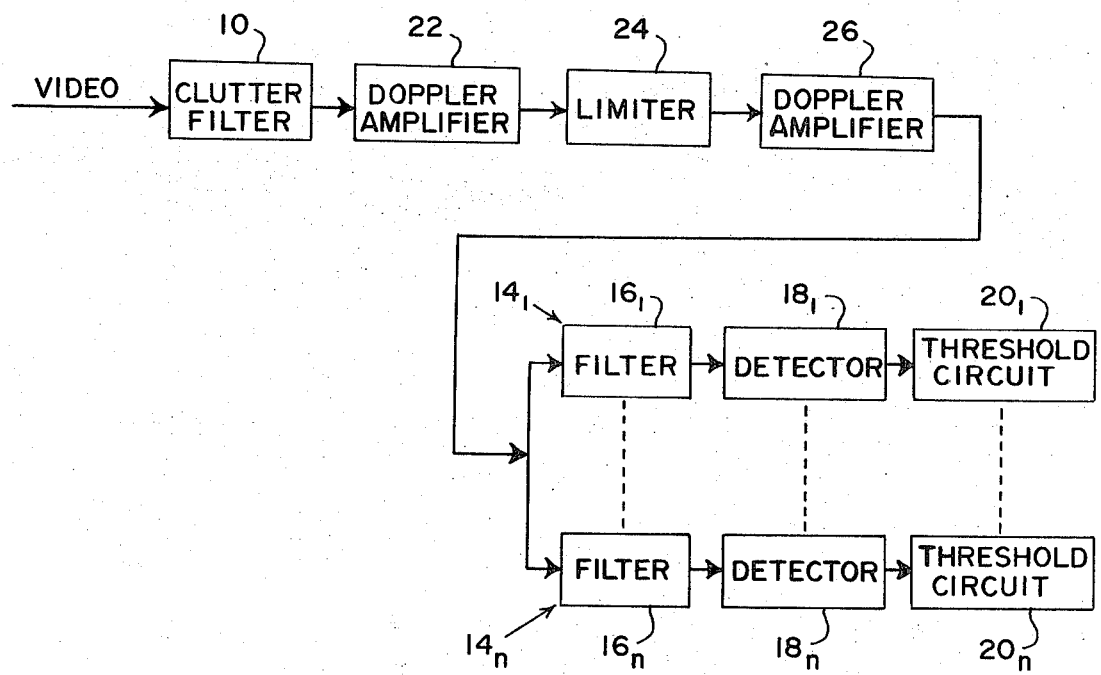
FIG. 2 is a block diagram of a portion of an MTI filter bank radar having means for suppressing clutter.

The circuit illustrated in the block diagram of FIG. 2 alleviates the problem of display of false target signals. The input video signal is applied, as above, to a clutter filter 10 which removes the large DC levels and lower frequency components. The remainder of the signal from the clutter filter is amplified by a Doppler amplifier 22. Doppler amplifier 22 is required in order to increase the signal to a value which a limiter 24 can work with. Limiter 24 is provided to give an output of constant power, no matter what the input is. Preferably, limiter 24 hard limits on system noise such that any signal which comes through exceeds the limiter level. The output from limiter 24 is amplified by Doppler amplifier 26 to give sufficient power to drive the predetection filters.

Limiter 24 limits the maximum power available at the input to the predetection filters which, in turn, limits the total power available at the output of the predetection filters.

For true target returns which are narrow band signals, the power out of the limiter 24 will appear at the output of only a single filter 16, but for clutter signals the power is generally distributed across all of the filter outputs, since clutter has a much wider bandwidth. Accordingly, the limited signal from clutter applied to any of the threshold devices 20 is much less than the signal from a true narrow band target return. The threshold device is set at such a level that a threshold is crossed when the signal is concentrated in a single filter, but for wide band signals, the output of any one filter will not be sufficient to cross this threshold.

The limiting level may be adjusted from any level below system noise to a level well above system noise, depending upon the required system sensitivity and expected clutter levels. The threshold level is set to correspond to the desired limit level.

While I have described above the principles of my invention in accordance with specific apparatus, it is to be clearly understood that the description is made only by way of example and not as a limitation of the scope of my invention, as set forth in the accompanying claims.

I claim:

1. In an MTI radar receiver, apparatus for suppressing response to clutter including a plurality of predetection filters having different pass bands, wherein the improvement comprises means for limiting the power applied to all of said filters to a predetermined amount, whereby the power of wide bandwidth signals will be divided by said filters and the power of narrow bandwidth signals will be passed mainly by a single filter.

2. Apparatus for suppressing response to clutter in an MTI radar receiver, comprising:
   a clutter filter having a video signal applied as an input thereto;
   a first Doppler amplifier coupled to said clutter filter;
   a limiter coupled to said first Doppler amplifier;
   a second Doppler amplifier coupled to said limiter; and
   a plurality of narrow band detection channels coupled to said second Doppler amplifier.

3. Apparatus for suppressing clutter as defined in claim 2, wherein each of said detection channels includes, a narrow band filter, a detector coupled to said narrow band filter, and a threshold circuit coupled to said detector.

4. Apparatus for suppressing clutter as defined in claim 3, wherein each narrow band filter has a different pass band.

5. Apparatus for suppressing clutter as defined in claim 4, wherein said threshold circuits have a threshold on the order of the limit level of said limiter.

6. Apparatus for suppressing clutter as defined in claim 5, wherein said limiter is a hard limiter.

7. Apparatus for suppressing clutter as defined in claim 6, wherein said limiter hard limits on system noise.

* * * * *